United States Patent [19]

McCrary

[11] 4,446,759

[45] May 8, 1984

[54] CLUTCH STROKE CONTROL METERING VALVE FOR AN AUTOMATIC TRANSMISSION

[75] Inventor: Paul T. McCrary, Ypsilanti, Mich.

[73] Assignee: Ford Motor Company, Dearborn, Mich.

[21] Appl. No.: 307,990

[22] Filed: Oct. 2, 1981

[51] Int. Cl.³ .................. F16H 47/00; B60K 41/06; B60K 41/08

[52] U.S. Cl. ..................... 74/867; 74/730; 74/869

[58] Field of Search ............... 74/867, 868, 869, 730, 74/752 C, 864; 137/509; 192/109 D

[56] References Cited

U.S. PATENT DOCUMENTS

| | | | |
|---|---|---|---|
| 3,099,172 | 7/1963 | Jania et al. | 74/751 |
| 3,309,939 | 3/1967 | Pierce, Jr. | 74/472 |
| 3,327,554 | 6/1967 | Searles | 74/472 |
| 3,344,681 | 10/1967 | Searles | 74/472 |
| 3,400,612 | 9/1968 | Pierce | 74/864 |
| 3,513,878 | 11/1967 | Smith | 137/509 |
| 3,613,484 | 10/1971 | Pierce et al. | 74/869 |
| 3,614,903 | 10/1971 | Noguchi et al. | 74/868 |
| 3,747,429 | 7/1973 | Uozumi et al. | 74/864 |
| 4,030,381 | 6/1977 | Lalin et al. | 74/867 |
| 4,161,895 | 7/1979 | Ushijima et al. | 74/867 |

Primary Examiner—Allan D. Herrmann
Assistant Examiner—Bruce F. Wojciechowski
Attorney, Agent, or Firm—Donald J. Harrington; Keith L. Zerschling

[57] ABSTRACT

A control system for an automatic transmission having planetary gear elements that define several forward driving torque delivery paths that are established and disestablished upon engagement and release of friction clutches and brakes including a timing valve for controlling the timing of the ratio change from a high direct drive ratio to an intermediate underdrive ratio including a pair of friction clutches that are engageable to establish the high speed ratio torque delivery path and a reaction brake that is applied upon release of one of the friction clutches to establish an intermediate speed ratio torque delivery path, the timing valve being effective to delay application of the brake during the downshift interval thus effecting a smooth ratio transition.

3 Claims, 4 Drawing Figures

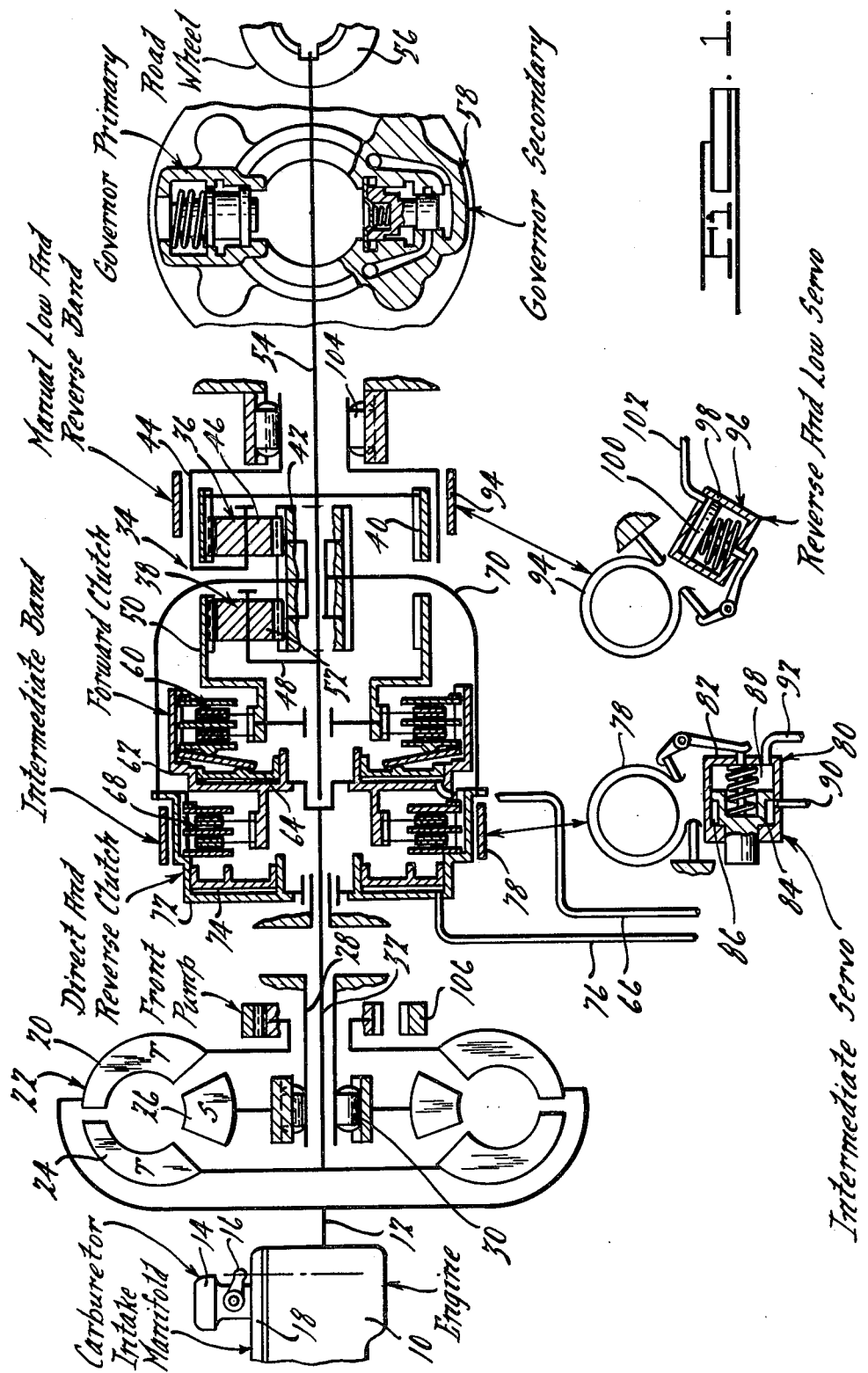

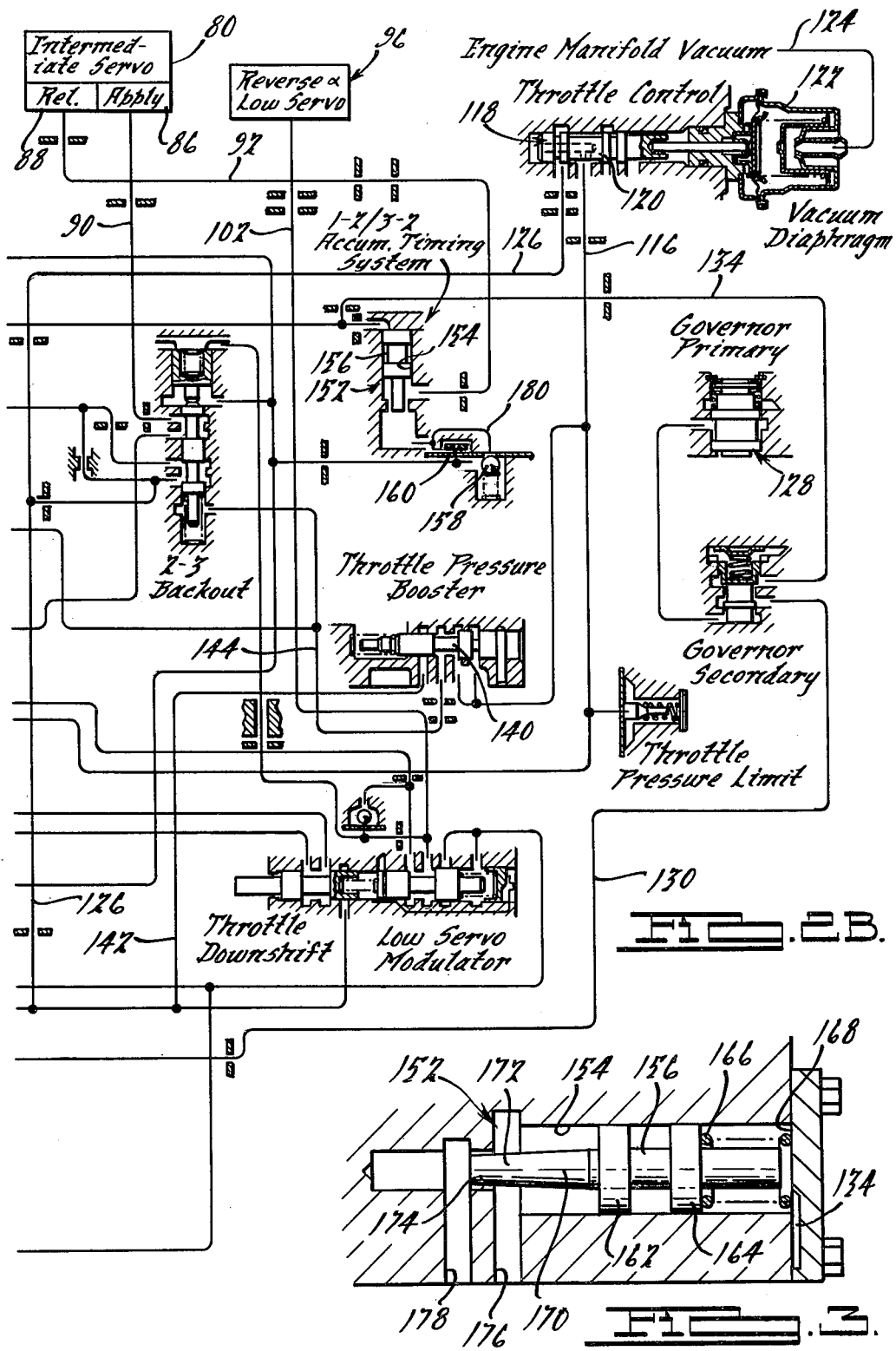

CLUTCH STROKE CONTROL METERING VALVE FOR AN AUTOMATIC TRANSMISSION

GENERAL DESCRIPTION OF THE INVENTION

The control system of this invention is adapted to be used in an engine driven vehicle driveline that includes a hydrokinetic torque converter and multiple ratio, planetary gearing wherein the vehicle driving axles are connected drivably to torque output elements of the planetary gearing through a geared differential-and-axle assembly. An example of an automatic power transmission that is capable of incorporating the invention is described in U.S. Pat. No. 3,309,939. Other related patent disclosures are U.S. Pat. Nos. 3,344,681; 3,613,484; 3,327,554 and 3,400,612.

Each of these prior art patents shows a planetary gear transmission in combination with a hydrokinetic torque converter having an impeller driven by an internal combustion engine and a turbine that is connected to torque input elements of the gearing. The relative motion of the elements of the gearing is controlled by clutches and brakes to establish a direct-drive, high speed ratio condition in the gearing. A pair of friction clutches is applied to achieve common rotation of the elements of the gearing. An intermediate speed ratio drive condition is established as one of the clutches is released and a friction brake is applied to establish a reaction point in the gearing whereby the torque output element of the gearing is underdriven with respect to the turbine. The brake is a double acting brake having a fluid cylinder and a cooperating piston that define opposed pressure chambers.

In my improved control system the clutch, which is released upon application of the brake, is a single acting clutch with a fluid cylinder and piston that define a single acting pressure chamber. Upon release of pressure fluid from the clutch pressure chamber, pressure on one side of the brake piston also is released so that fluid pressure applied to the opposite side of the brake piston causes the brake to become applied. The rate of application of the brake is controlled by a timing valve. By controlling the rate of flow of fluid from the release side of the brake piston as actuating pressure is distributed to the apply side of the brake piston, the rate at which the brake piston is stroked is controlled and the interval between the release of the clutch and the application of the brake upon a downshift from the direct drive ratio to the underdrive intermediate ratio thus is controlled.

A downshift from the high ratio to the intermediate ratio due to operator torque demand will result in a rapid increase in engine speed. Upon disengagement of the direct drive clutch the engine is allowed to accelerate freely in neutral and application of the intermediate speed ratio brake in the manner described in the foregoing paragraphs takes place after the engine has attained the proper speed to complete the downshift smoothly. Governor pressure supplied by a conventional transmission governor valve is the variable that senses the resulting increased vehicle speed. The geometry of the brake servo and the calibration of the regulator for the control pressure that is applied to the apply side of the intermediate speed ratio brake as well as to the timing control valves for the release pressure for the brake are interrelated to establish the proper intermediate brake servo stroke time and the proper pressure force that balances the spring force acting on the brake servo piston. This controls the so-called "neutral time" so that the interval during which the engine is allowed to accelerate upon a downshift increases as the vehicle speed increases. The transmission control valve calibration can be tailored for any particular engine acceleration characteristic to achieve an imperceptible downshift from third ratio to the intermediate underdrive ratio.

A downshift timing valve for effecting a controlled downshift is shown in U.S. Pat. No. 3,099,172 (Jania), which is assigned to the assignee of this invention. That timing valve comprises a simple valve spool and a control orifice situated in the servo brake release passage in parallel disposition with respect to a valve controlled release conduit. The timing valve responds to governor pressure either to open the release passage or to block it depending upon the vehicle speed. When the passage is blocked, the pressurized fluid on the release side of the brake servo is required to pass through the control orifice thus delaying the application of the brake upon a downshift. There is no attempt in that design to achieve a variable timing control that will continuously monitor the vehicle speed to achieve optimum timing between clutch release and brake application for all driving conditions for any particular engine and transmission installation for which the valve is calibrated. Another example of a prior art timing valve construction is shown in FIG. 5 of U.S. Pat. No. 3,614,903 wherein metering pins are used to control the rate of application of pressure to either one or the other brake in a transmission system, but there is no attempt there to use a double acting brake cylinder that has a release chamber in communication with a clutch chamber. Neither is there an attempt to describe a means for effecting a change in the calibration in response to changing vehicle speeds.

BRIEF DESCRIPTION OF THE FIGURES OF THE DRAWINGS

FIG. 1 shows in schematic form a power transmission having planetary gearing, a torque converter and transmission clutches and brakes.

FIGS. 2A and 2B show a control circuit for controlling the application and release of the clutches and brakes schematically shown in FIG. 1.

FIG. 3 is an enlarged view of a 1-2/3-2 accumulator timing valve assembly which appears also in the schematic circuit drawing of FIG. 2B.

PARTICULAR DESCRIPTION OF THE INVENTION

Figure 2A:
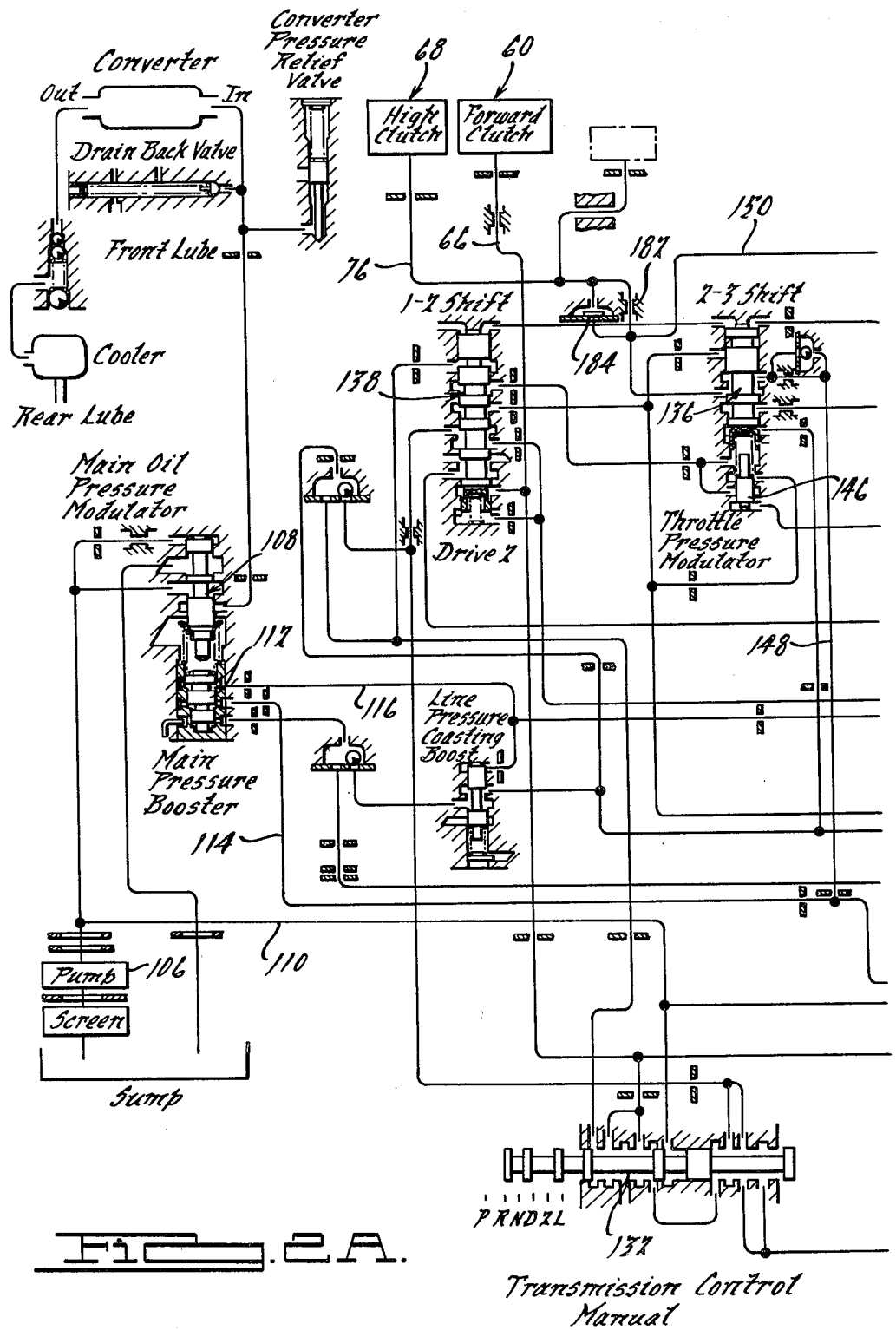

In the schematic drawing of FIG. 1 a vehicle internal combustion engine is shown at 10. It has a crankshaft 12 and an air-fuel carburetor 14 which is controlled by a throttle valve having a driver operated linkage 16. The carburetor 14 supplies an air fuel mixture to engine intake manifold 18.

The engine crankshaft 12 is connected to the impeller 20 of a hydrokinetic torque converter 22. Converter 22 includes, in addition to the impeller 20, a bladed turbine 24 and a bladed stator 26 arranged in fluid flow relationship with respect to the impeller. Stator 26 is supported on a stator sleeve shaft 28 and is prevented from rotation in a direction opposite to the direction of rotation of the impeller by overrunning brake 30.

Turbine 20 is connected drivably to turbine shaft 32 which serves as a torque input shaft for multiple ratio gearing shown generally at 34.

In the particular embodiment shown in FIG. 1 gearing 34 comprises two simple planetary gear units 36 and 38. Gear unit 36 has a ring gear 40, a sun gear 42 and a carrier 44. Planet pinions 46 are journalled on the carrier 44 in meshing engagement with the sun and ring gears 42 and 40, respectively. Gear unit 38 comprises carrier 48, ring gear 50 and sun gear 42 which is common to the gear unit 36. Carrier 48 journals pinions 52 which mesh respectively with ring gear 50 and sun gear 42. Carrier 48 and ring gear 40 are connected directly to torque output shaft 54 which is connected drivably to the road wheels 56. A fluid pressure governor assembly 58 is drivably connected to the shaft 54 and is adapted to develop a pressure signal that is proportional in magnitude to the driven speed of shaft 54.

Turbine shaft 32 is adapted to be connected to ring gear 50 through forward clutch 60. Clutch 60 comprises clutch cylinder 62 in which is positioned annular piston 64. Cylinder 62 and the torque output element of the clutch 60 carry friction discs that are urged into frictional engagement by the piston 64 as fluid pressure is admitted to the pressure chamber defined by the cylinders 62 and the piston 64, a pressure feed passage 66 being provided for that purpose.

A direct-and-reverse clutch 68 is adapted to connect turbine shaft 32 to drive shell 70 which distributes torque from clutch 68 to sun gear 42. Clutch 68 comprises a clutch cylinder 72 with a cooperating annular piston 74. These cooperate to define a pressure chamber that is pressurized as regulated control pressure is distributed to it through passage 76. Friction discs carried by the cylinder 72 and the cylinder 62, respectively, are engaged frictionally when the pressure chamber for the clutch 68 is pressurized.

Brake band 78 surrounds cylinder 72. It is adapted to be applied and released by an intermediate servo 80 which comprises a servo cylinder 82 and a cooperating servo piston 84. The piston 84 and the cylinder 82 define opposed pressure chambers; namely, a clutch apply chamber 86 and a clutch release chamber 88. When pressure is distributed through passage 90 to the clutch apply chamber 86, the servo piston actuates and engages brake band 78. When fluid pressure is admitted to passage 92, the servo release chamber 88 is pressurized and the brake band 78 becomes released. When both pressure chambers 86 and 88 are pressurized, the servo assumes a brake release condition.

A reverse-and-low brake band 94 surrounds a brake drum that forms a part of the carrier 44. A low-and-reverse brake servo 96 is adapted to apply and release the brake band 94. Servo 96 includes a cylinder 98 and a cooperating piston 100 which define a pressure chamber that is pressurized as fluid pressure is distributed to it through passage 102.

Carrier 44 is adapted to be braked during normal forward drive operation in the lowest ratio by an overrunning brake 104.

During operation in the lowest forward driving ratio, the forward clutch 60 is engaged thus permitting turbine torque to be delivered to a ring gear 50. Forward driving torque is delivered to the carrier 48 and the output shaft 54. Sun gear 42 tends to be driven in a reverse direction; and with the carrier 44 acting as a reaction point, the ring gear 40 is driven in a forward driving direction thus establishing two torque delivery paths through the gearing from the turbine shaft to the torque output shaft 54.

An upshift from the lowest driving ratio to the intermediate ratio is achieved by applying brake band 78. This anchors the sun gear 42 so that it acts as a reaction point; and with the ring gear 50 connected to the turbine shaft 32, ring gear 48 and output shaft 54 are driven in an intermediate underdrive ratio. Overrunning brake 104 permits carrier 44 to freewheel at that time.

An upshift to the direct drive ratio from the intermediate underdrive ratio is achieved by engaging simultaneously both clutches 68 and 60. The brake band 78 is released; thus the elements of the gearing rotate in unison with a 1:1 ratio.

Reverse drive is obtained by applying brake band 94, thereby anchoring the carrier 44. Clutch 60 is released and clutch 68 is applied. Turbine shaft 32 now becomes connected to sun gear 42; and with the carrier 44 acting as a reaction point, ring gear 40 and shaft 54 are driven in a reverse direction.

FIGS. 2A and 2B show a control valve circuit for controlling the application and release of the clutches described with reference to FIG. 1. Numeral 106 in FIG. 2A identifies the front pump which acts as a pressure source for the control system. The front pump is driven by the impeller as indicated schematically in FIG. 1. The output side of the pump 106 communicates with the main oil pressure regulator valve 108 which serves to regulate the magnitude of the pressure in control pressure line 110. Regulator 108 includes a spool valve that is urged in an upward direction, as seen in FIG. 2A, by a valve spring. A main pressure booster 112 acts on the spring and is subjected to reverse clutch pressure, which is distributed to it through line 114. It is subjected also to a throttle pressure signal distributed to it through passage 116. When the reverse clutch is pressurized, the valve 108 regulates at a higher pressure level to increase the clutch and brake capacity. Similarly, when the engine torque increases, the pressure in passage 116 increases, thereby boosting the regulated output pressure from the valve 108.

The signal in passage 116 is obtained from a throttle valve assembly 118 which includes a valve spool 120 actuated by a vacuum diaphragm 122. The vacuum diaphragm is connected to the engine intake manifold through passage 124. Control pressure from passage 110 is distributed to the throttle valve assembly 118 through passage 126. When the engine manifold pressure changes, the modulated output pressure in passage 116 is adjusted so that its magnitude is generally proportional to engine torque.

A governor valve assembly 128 also is supplied with control pressure through passage 130, which receives its pressure from the manual valve 132. Manual valve 132 distributes pressure to the passage 130 during operation in each of the forward driving ratios. The governor pressure signal developed by governor 128 is distributed through passage 134 to the 2-3 shift valve 136 and to the 1-2 shift valve 138.

Throttle pressure from throttle valve 118 is distributed to the shift valves through the throttle pressure booster 140. Control pressure is distributed to the throttle pressure booster 140 through passage 142 which communicates with the previously described passage 110. The throttle pressure booster output pressure, which effectively is an augmented throttle pressure, is distributed through passage 144 to the throttle pressure modulator 146 located at the base of the 2-3 shift valve 136. Throttle pressure modulator 146 reduces the throttle pressure and that reduced pressure acts on the lower end of the 2-3 shift valve 136 as well as on a differential area on adjacent lands of the adjacent shift valve 138. It thus causes a pressure force to be exerted on each of the shift valves to oppose the governor pressure acting thereon thereby delaying the upshift point depending upon the magnitude of the engine torque as represented by the engine intake manifold pressure.

As seen in FIG. 1, the intermediate servo is double acting; that is, there is a pressure chamber on either side of the piston 84. When both pressure chambers are pressurized, the piston is stroked to a brake release position. When chamber 88 is exhausted, the pressure in chamber 86 causes the brake to become applied as the piston is stroked against the force of the spring.

On a 3-2 downshift the direct clutch 68 becomes released, and the intermediate servo becomes applied. This occurs as the 2-3 shift valve is moved in an upward direction thus connecting passage 76 with passage 148 which communicates with the exhaust region through an exhaust port in the manual valve 132. Passage 150 communicates with passage 76 and it also is exhausted through the common exhaust fluid flow path through the 2-3 shift valve on a 3-2 downshift. Passage 150 communicates with the accumulator timing system 152, which comprises a valve chamber 154 and a movable valve spool located therein as shown at 156. Passage 150 communicates with passage 92 on the release side of the intermediate servo 80 through the chamber 154. When fluid is exhausted from the release side of servo 80, the fluid is displaced through passage 92 and through the accumulator timing system, which includes one way check valve 158, to the passage 150. It then flows to the exhaust port in the manual valve through the 2-3 shift valve 136. Check valve 158 bypasses flow restricting orifice 160 which restricts the rate of flow of fluid from passage 150 to the passage 92 on a 2-3 upshift as the intermediate servo becomes released. The top side of this valve spool 156 is subjected to the governor pressure in passage 134.

I have shown in FIG. 3 an enlarged view of the valve system 152. As seen in FIG. 3, valve spool 156 comprises a pair of lands 162 and 164 slidably situated in valve chamber 154. The spacing of the lands is such that the valve 156 is stable as it moves in the chamber 154. Valve spring 166 is seated on the end wall 168 and governor pressure is distributed to the spring chamber that contains the spring 166. A part of the passage 134 that distributes governor pressure to the valve 152 is shown in FIG. 3. The left hand end of the spool 156 contains a metering pin or stem 170. It is tapered with a predetermined calibration as shown at 172, and the tapered portion is received in flow restricting orifice 174. A servo release port 176 communicates with the chamber 154 on the right hand side of the orifice 174. An exhaust port 178 communicates with the opposite side of the port 174. Port 176 communicates with passage 92 and port 178 communicates with passage 180 that extends to passage 150 through check valve 158 and through flow restricting orifice 160.

The shift quality is improved during a 3-2 torque demand downshift since the delay in the exhausting of the release side of the intermediate servo allows the engine to accelerate freely in neutral as the direct drive clutch 68 becomes released. The magnitude of the delay between the release of the clutch and the application of the brake is determined by the valve 152. If the vehicle speed at the instant of a 3-2 downshift is high, the force of the governor pressure acting on the valve 152 is high, which tends to increase the degree of restriction in the release fluid flow path. This results in a greater time for the engine to accelerate to the proper speed prior to the completion of the downshift. The release of the high speed ratio clutch 68 is effected by causing the high clutch fluid to be exhausted through exhaust flow restricting port 182 in the passage 76. This port is bypassed on an upshift by one-way check valve 184. This orificing effect produces a relatively short direct clutch release time. The apply time for the intermediate servo is controlled by the metering valve 152. This valve in combination with the fixed flow orificing effect results in an increasing neutral time as vehicle speed increases. The downshifts may be calibrated to achieve the desired engine acceleration from third gear to second gear, the calibration being determined by the engine characteristics and the torque capacity of the transmission.

Having described a preferred embodiment of my invention, what I claim and desire to secure by U.S. Letters Patent is:

1. In an automatic transmission for use in a vehicle driveline having an internal combustion engine and multiple ratio gearing establishing plural torque delivery paths between the engine and vehicle traction wheels:

fluid pressure operated servos including a brake servo and a clutch servo for effecting speed ratio changes by controlling the relative motion of the elements of the gearing;

said clutch servo being applied during high speed ratio operation and released during intermediate speed ratio operation and said brake servo being released during high speed ratio operation and applied during intermediate speed ratio operation;

said brake servo having a pressure movable piston with two pressure chambers, one on each side thereof, the effective pressure area on the release side of the piston being greater than the effective pressure area on the apply side thereof so that the piston assumes a brake release position when both chambers are pressurized;

shift valve means for selectively distributing and exhausting pressure from said pressure chambers;

a source of an engine torque signal and a source of a speed signal proportional to the driven speed of said vehicle communicating with said shift valve means for actuating the same;

an accumulator timing valve in fluid communication with the release side of said brake servo comprising a valve chamber and a movable valve spool therein;

a flow metering orifice in said valve chamber;

said movable valve spool having a metering stem thereon registering with said orifice and adapted to move relative to said orifice to decrease the effective flow area of said orifice upon movement thereof in one direction and effective to increase the effective flow area of said orifice upon movement thereof in the opposite direction;

said timing valve being in fluid communication with said governor the latter effecting a pressure force on the former to shift said spool toward a said one direction thereby delaying the application of said brake upon a ratio change from the high speed ratio to an intermediate speed ratio, the magnitude of the delay being dependent upon said driven speed.

2. The combination as set forth in claim 1 wherein said metering valve includes a one way check valve in series with said valve chamber and communicating with said chamber on one side of said flow restricting orifice;

said one way check valve being located in and forming a part of the fluid flow path accommodating release of fluid from the release side of said brake servo during a ratio change from the high speed ratio to the intermediate speed ratio.

3. The combination as set forth in claim 2 wherein said timing valve comprises further a flow restricting orifice in parallel relationship with respect to said one way check valve whereby fluid is distributed to the release side of said intermediate servo through said orifice to delay release of said intermediate brake servo and to cushion the ratio change from an intermediate speed ratio to a high speed ratio.

* * * * *